July 5, 1949.　　　　　T. H. RIVERS　　　　　2,474,986
TRACTOR TRAILER ROAD VEHICLE COUPLING
Filed June 25, 1946　　　　　　　　　　　　　3 Sheets-Sheet 1
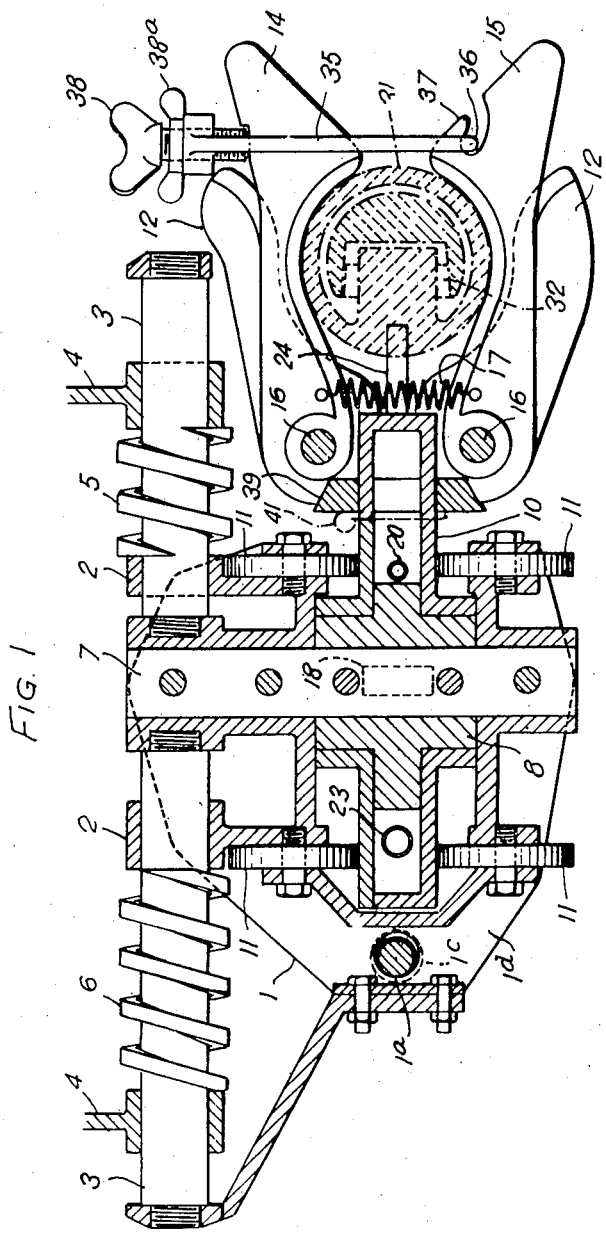
Inventor
Thornton H. Rivers
by Wilkinson & Mawhinney
Attorneys July 5, 1949. T. H. RIVERS 2,474,986
TRACTOR TRAILER ROAD VEHICLE COUPLING
Filed June 25, 1946 3 Sheets-Sheet 2
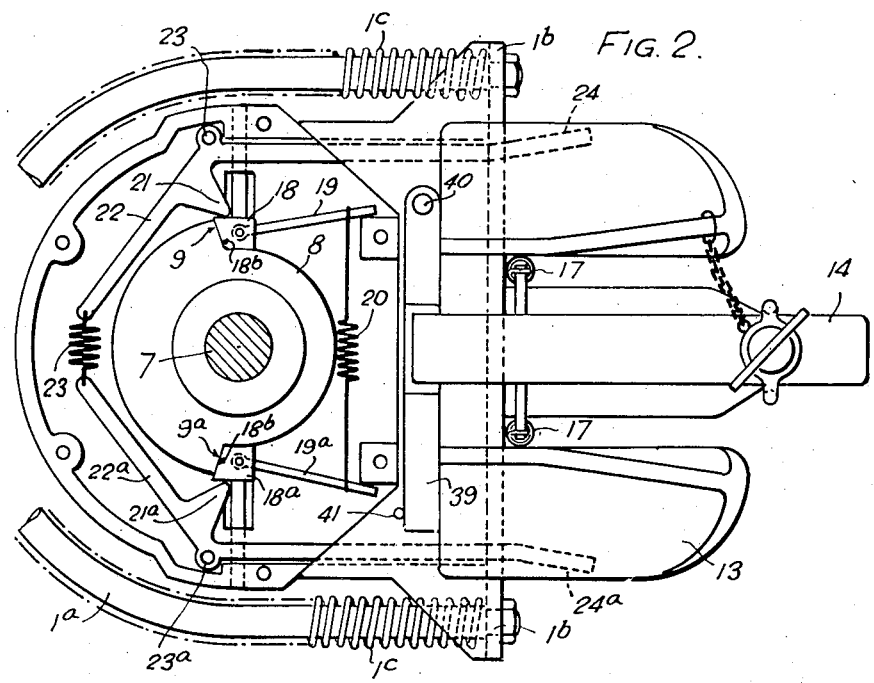
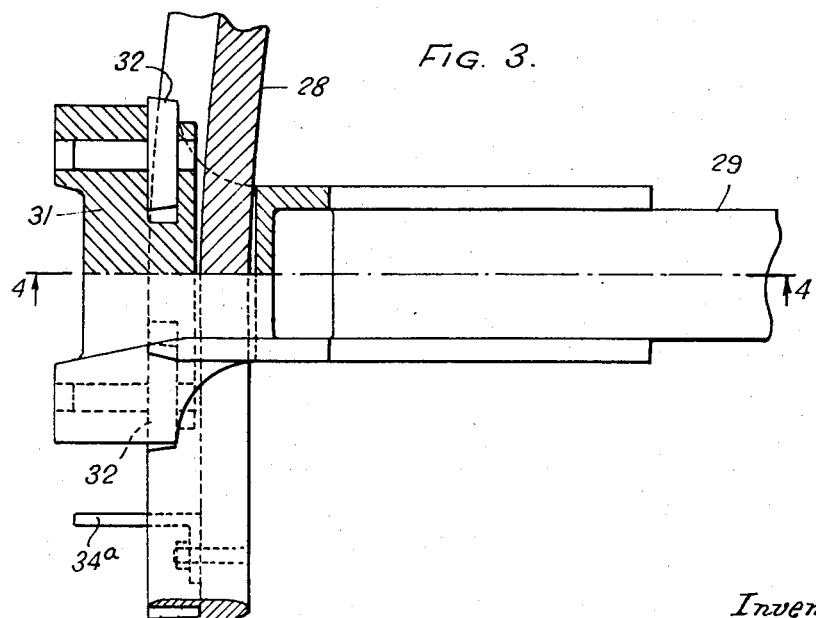
Inventor
Thornton H. Rivers
by Wilkinson & Mawhinney
Attorneys July 5, 1949.  T. H. RIVERS  2,474,986
TRACTOR TRAILER ROAD VEHICLE COUPLING
Filed June 25, 1946  3 Sheets-Sheet 3
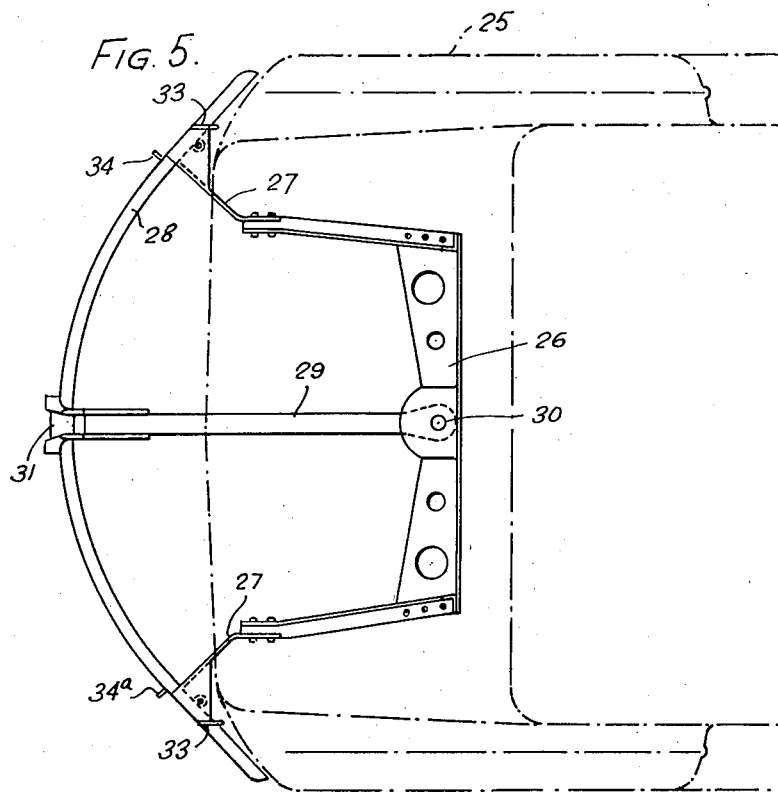
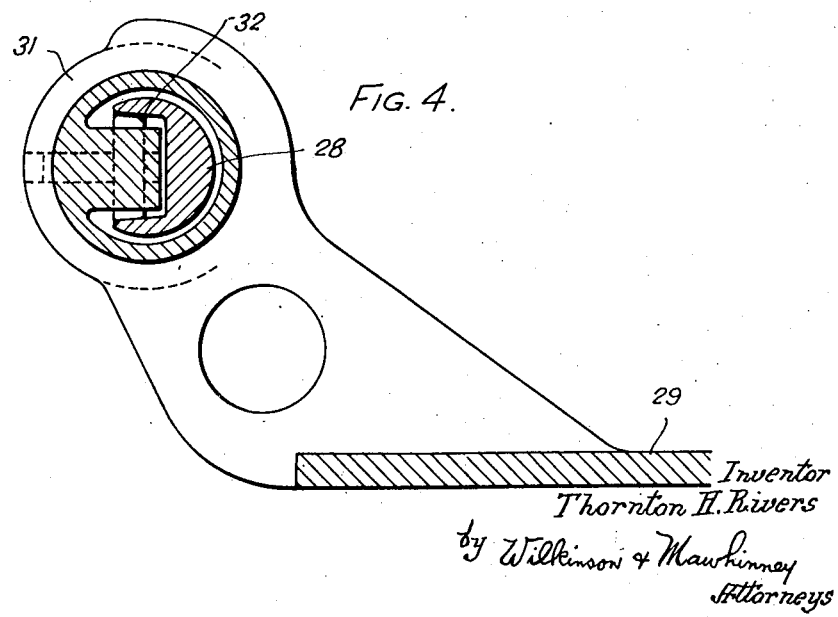
Inventor
Thornton H. Rivers
by Wilkinson & Mawhinney
Attorneys Patented July 5, 1949

2,474,986

UNITED STATES PATENT OFFICE 2,474,986

TRACTOR-TRAILER ROAD VEHICLE COUPLING

Thornton Hartley Rivers, Redruth, England

Application June 25, 1946, Serial No. 679,105
In Great Britain July 18, 1945

3 Claims. (Cl. 280—33.44)

The present invention relates to coupling devices for connecting a trailer road vehicle, such as a caravan, to a tractor road vehicle.

According to the present invention a coupling for trailer and tractor road vehicles comprises an arc-shaped draw bar adapted to be secured to the tractor and to extend transversely thereof, and a coupling head adapted to be mounted on the trailer and having means for engaging the draw bar in such a manner as to permit the head to traverse along the draw bar should the tractor take up a position at an angle to the longitudinal axis of the trailer.

The invention also includes a coupling head for a trailer road vehicle comprising a rotatable member normally held against rotation and provided with pivoted jaws or like means adapted to engage and traverse along an arc-shaped draw bar extending transversely of a towing road vehicle, and means for releasing the member to permit its rotation about a vertical axis after a predetermined traversing movement of the head along the draw bar.

To enable the invention to be fully understood, one embodiment of the invention will now be described with reference to the accompanying drawings in which:

Fig. 1 is a central longitudinal section of the trailer coupling head,

Fig. 2 is a plan thereof partly in section,

Fig. 3 is a fragmentary section of part of the draw bar and sleeve,

Fig. 4 is a section on line 4—4 of Fig. 3, and

Fig. 5 is a plan showing the draw bar and its connection with the tractor vehicle.

As shown in the accompanying drawings a trailer road vehicle carries a coupling head which is shown more particularly in Figs. 1 and 2.

The coupling head comprises a body 1 provided with upstanding brackets 2 having apertures through which are inserted spindles 3 which are rotatably and slidably mounted in bearing members 4 forming part of, or secured to, the chassis or frame of a trailer vehicle, for example a caravan. A draw spring 5 and a buffer spring 6 are threaded round the spindles, the opposite ends of the springs being adapted to abut the brackets 2 and bearing members 4. A post 7 is rigidly secured to the body 1 and has a plate 8 rigidly secured thereto. The plate 8 is cut away to form a recess terminating in cam faces 9, 9a.

A casing 10 is rotatably mounted in the body 1 and encloses the plate 8, the upper and lower faces of the casing engaging rollers 11. Two pairs of fixed jaws 12, 13 are carried by the casing 10 and centrally disposed between the fixed jaws are located two jaws 14, 15 which pivot about the pins 16 which support the jaws in a suitable manner on the casing 10.

A spring 17 is anchored to the jaws 14, 15 tending to move them into the closed position shown in Fig. 1.

The casing 10 is normally locked against rotation relative to the cam plate 8 by means of plungers 18, 18a having inclined faces 18b, 18c engaging the cam surfaces 9, 9a. The plungers are pivoted to rods 19, 19a which are urged into locking position by a spring 20. The plungers are positively held in locking position by the noses 21, 21a and arms 22, 22a of bell crank levers, which are pivoted to the casing 10 at 23, 23a the noses being held in position overlying the plungers by a spring 23. The bell-crank levers include arms 24, 24a which extend beyond the casing and are adapted to be actuated by means carried by the draw bar on the tractor vehicle.

The tractor vehicle which may comprise an automobile of conventional design is indicated by 25 and is provided with a frame structure 26 secured to the chassis of the automobile. The arms 27 of the frame support an arc-shaped draw bar 28 which is of channel shape in cross-section. A radius arm 29 is pivoted at 30 to the frame 26 and carries at its free outer end a sleeve 31 which encircles the draw bar, the sleeve being provided with a pair of rollers 32 which are adapted to run in the channel of the draw bar. The draw bar is provided with end stops 33 and with abutments or triggers 34, 34a adjacent to and on the inward side of the respective stops 33.

As more particularly shown in Fig. 1 the coupling head of the trailer is connected with the draw bar 28 by opening the jaws 14, 15 and passing them over the central part of the sleeve 31, the fixed pairs of jaws 12, 13 embracing the sleeve on each side. The pivoted jaws are locked in position by a clamp comprising a shank 35 having a hook or loop 36 which engages a hook 37 on the jaw 15, the clamp being tightened by a bolt 38 screwing into abutment with the upper face of the jaw 14. A lock nut 38a is provided. As an additional safety precaution the jaws 14, 15 are secured in operative position by a wedge 39 pivoted at 40 and adapted to engage under the heel portions of the jaws 14, 15 near the pivot pin 16. The wedge 39 is locked in position by a pin 41.

A rod 1a encircles the body 1 and its ends are anchored at 1b to opposite sides of the casing 10 adjacent to the jaws 13. Springs 1c are threaded over the rod, the ends of the springs respectively abutting opposite sides of a central wall 1d of the body, and abutting the casing adjacent the anchored points 1b. The purpose of the springs is to return the casing 10 to its central position, shown in Fig. 2, after the lever 24 or 24a has been moved out of engagement with the actuating abutment 34 or 34a.

When the coupling head is connected with the draw bar as shown in Fig. 1, the strain of towing is transmitted to the trailer through the jaws 14, 15. In towing, should the tractor make any relatively small turning movement relative to the longitudinal axis of the trailer, for example up to 27°, the jaws 14, 15 and the sleeve will traverse the draw bar until the line along which the pull is exerted by the tractor is in line with the longitudinal axis of the trailer.

If, however, a greater turning angle is developed, the sleeve will, upon reaching the end of the traversing movement along the draw bar in one direction, cause the lever 24 to strike an abutment 34 and in consequence the arm 22 will be moved about its pivot to withdraw the nose 21 from the plunger 18 and then further turning movement is permitted by the coupling head turning about the cam plate 8 against the pressure of one or other of the springs 1c, the cam surface 9 engaging 18b and displacing the plunger 18 radially against the pressure of the spring 20. On the coupling being returned to its former small angular position by the springs 1c the plunger 18 will automatically drop into the recess in the cam plate and the nose 21 will be urged by its spring 23 to lock it in position.

It will be understood that the operation of the lever 24a by the abutment 34a permits the coupling head to turn in the opposite direction to that described above so that the desired additional angular movement is permitted according to which end of the draw bar is reached by the sleeve 31. The plunger not actuated by an abutment remains in engagement with the recess in the cam plate and accordingly when the casing is returned to its normal central position, as shown in Fig. 2, it will thereby be prevented from over-riding its central position.

By virtue of the present invention the trailer is able automatically to take up a position relative to the tractor, such that the pull exerted by the tractor is in line with the longitudinal axis of the trailer.

The arrangement is preferably such that the line on which the pull is exerted during traversing cuts the longitudinal axis of the tractor between the rear wheels of the tractor or at a point forwardly thereof.

The traversing movement allows comparatively small angle corners to be taken at normal cruising speeds of the vehicle and the additional rotational movement of the head allows for wider angle cornering which would normally be taken at slower speeds.

Further relative movement between the tractor and trailer is permitted in horizontal and vertical planes due to the coupling head being rotatable relative to the bearing members 4, and then being slidable along the draw bar.

I claim:

1. A tractor-trailer vehicle coupling comprising an arc-shaped draw-bar extending transversely at the rear of a tractor vehicle, a coupling head mounted on a trailer vehicle, the said coupling head comprising a rotatably mounted casing, coupling jaws mounted on said casing and engaging said draw-bar for traversing movement along said draw-bar, a vertical post non-rotatably mounted in said head, a plate fast on said post, and provided with cam-shaped shoulders, spring actuated plungers carried by said casing and engaging said shoulders to lock the casing and plate together against relative rotation, spring actuated levers pivoted to said casing, projections on said levers overlying said plungers to hold them in locking position, abutments at opposite ends of said draw-bar for actuating said levers to displace the projections from engagement with said plungers to permit withdrawal of said plungers from said shoulders and subsequent rotation of said casing relative to the said plate, and spring means mounted on said coupling head for returning said casing into a position for automatic relocking to said plate upon the disengagement of said levers from said abutments.

2. A coupling device adapted to be mounted on a trailer vehicle comprising a casing carrying coupling jaws, a vertical post non-rotatable secured to the said trailer vehicle, means supporting said casing for rotational movement about said post in a horizontal plane, a plate fast on said post, shoulders in said plate, plungers mounted on said casing, spring means urging said plungers to engage said shoulders, levers pivoted on said casing and projections on said levers, spring means urging said levers to position the said projections over said plungers to lock them in engagement with said shoulders, means for actuating said levers to disengage said projections from said plungers to permit rotation of said casing and spring means tending to return said casing after its rotation to a position relative to said plate as to permit the relocking of the said plungers by said levers upon the release of said levers by their said actuating means.

3. A tractor-trailer vehicle coupling comprising an arc-shaped draw-bar adapted to be attached to extend transversely at the rear of a tractor vehicle, a trailer coupling member mounted for traversing movement along said draw-bar, a coupling head adapted to be mounted on a trailer vehicle and connected with said trailer coupling member, a carrier supporting said trailer coupling member and rotatably mounted in said coupling head, a non-rotatable cam plate in said head, recesses in said cam plate, spring actuated locking detents on said carrier engaging in said recesses to lock the carrier to said cam plate, an abutment at each end of said draw-bar, lever means engaging said detents to hold them in locking position, said lever means being operable by said abutments to withdraw said lever means from engagement with said detents to permit rotation of the carrier relative to said coupling head, and spring means for automatically returning said carrier to a predetermined central position relative to said coupling head, upon the release of said lever means from said abutments.

THORNTON HARTLEY RIVERS.

REFERENCES CITED

The following references are of record in the file of this patent:

UNITED STATES PATENTS

| Number | Name | Date |
|---|---|---|
| 993,597 | Harvat | May 30, 1911 |
| 1,021,446 | Buhoup | Mar. 26, 1912 |
| 1,205,351 | Johnson | Nov. 21, 1916 |
| 1,287,459 | Schroeder | Dec. 10, 1918 |
| 1,627,998 | Porter | May 10, 1927 |
| 1,830,874 | Hendrickson | Nov. 10, 1931 |
| 2,144,295 | McGregor | Jan. 17, 1939 |
| 2,197,248 | Bonham et al. | Apr. 16, 1940 |
| 2,384,363 | Bingham | Sept. 4, 1945 |

FOREIGN PATENTS

| Number | Country | Date |
|---|---|---|
| 235,855 | Great Britain | Sept. 3, 1925 |